March 18, 1924. 1,486,911

G. L. R. J. MESSIER

PNEUMATIC SUSPENSION FOR VEHICLES

Filed April 3, 1920

Inventor:
George Louis René Jean Messier.
per H. W. Penrose
Attorney.

Patented Mar. 18, 1924.

1,486,911

UNITED STATES PATENT OFFICE.

GEORGE LOUIS RENÉ JEAN MESSIER, OF BORDEAUX, FRANCE.

PNEUMATIC SUSPENSION FOR VEHICLES.

Application filed April 3, 1920. Serial No. 371,104.

*To all whom it may concern:*

Be it known that I, GEORGE LOUIS RENÉ JEAN MESSIER, of 126 Rue Fondaudège, Bordeaux, Gironde, France, have invented a Pneumatic Suspension for Vehicles, of which the following is a full, clear, and exact description.

This invention relates to pneumatic shock absorbers more particularly adapted for use as a suspension apparatus for motor vehicles.

Pneumatic shock absorbers have already been proposed comprising a piston moving in a cylinder containing compressed air and in which the quantity of air forming a resilient cushion between the end of the cylinder and the piston is controlled on the one hand by a compressed air inlet valve provided with a rod entering within the cylinder and on which the piston acts at a given moment of its upward stroke,—and, on the other hand, by an exhaust orifice opening to the atmosphere and uncovered by the piston at a given moment of its downward stroke.

In these devices, the compressed air piping is in direct communication with the cylinder when the valve is lifted, and the following disadvantage results therefrom, viz—if the pressure of the air compressed between the piston and the end of the cylinder becomes greater than the pressure of the air of the piping, the air of the cylinder passes in this piping and a shock of the piston against the bottom of the cylinder then occurs.

The improvement forming the subject-matter of the present patent is adapted to remedy this inconvenience.

This improvement is characterized in that the body of the cylinder is provided at its upper part with an intermediate inlet chamber, capable of being put in communication, on the one hand with a compressed air piping through a valve the rod of which extends within the cylinder so that it can be actuated by the piston at a given moment of its stroke—and on the other hand, with the interior of the cylinder through a valve opening in the latter.

The interposition of this intermediate chamber between the cylinder and the compressed air piping has the effect of never allowing direct communication of the interior of the cylinder with the compressed air piping, even if the pressure of the air, compressed between the piston and the end of the cylinder should become greater than that of the air of the piping. Even in this case, the air, contained in the cylinder, can never come back into this piping, it can therefore never produce any shock of the piston against the end of the cylinder, since no possible issue is offered to the air of this cylinder.

By means of its special combination, the present suspension device always operates in the same conditions whatever may be the variations of the load carried by the vehicle.

In order that the invention may be clearly understood, a form of execution of the present pneumatic suspension device will be described hereafter with reference to the accompanying drawings in which.

Figure 1:
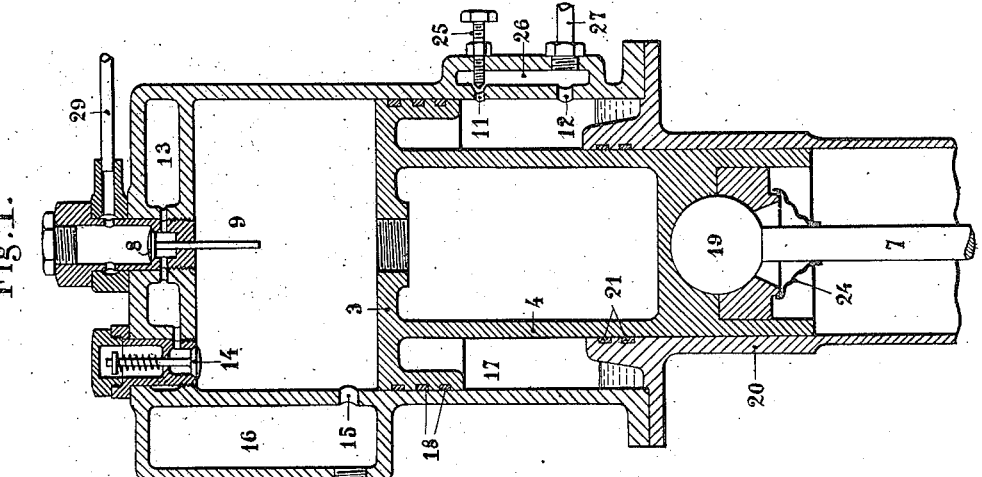
Fig. 1 is a vertical section of the improved suspension device.
Figure 2:
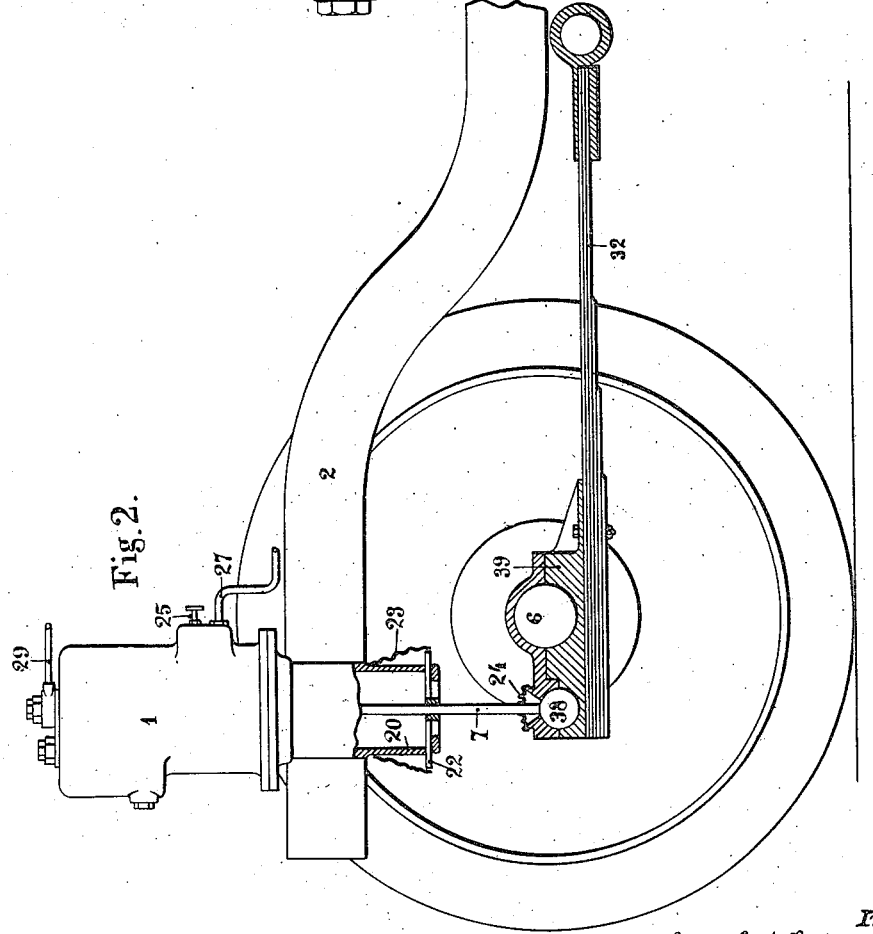
Fig. 2 shows in elevation, partly in section a method of fitting up this suspension device.

As illustrated in the drawings, the suspension device made in accordance with this invention substantially comprises for each axle end a cylinder 1 secured to the frame 2 and in which moves a piston 3 connected to the axle by a link 7.

This cylinder comprises, at its upper part, a double end constituting a chamber 13; this chamber can communicate, on the one hand, with a compressed air piping 29 by a valve 8 the rod 9 of which extends within the cylinder, and, on the other hand, with the interior of the cylinder by a valve 14 opening towards the interior of the cylinder and preventing the return of the air from the said cylinder into the chamber 13 and the piping 29.

Owing to the interposition of the intermediate chamber 13, no direct communication of the interior of the cylinder 1 with the compressed air piping 29 can ever take place, even if the pressure of the air compressed between the piston 3 and the end of the cylinder 1 should become greater than that of the air of the piping 29; consequently, even in this case, the air of the cylinder cannot come back in this piping; therefore no shock whatever of the piston against the bottom of the cylinder can ever take place, no possible issue being offered to the air of this cylinder.

The wall of the cylinder 1 is perforated, at suitable levels, with two orifices 11 and 12, opening in a chamber 26, from which the air escapes through the conduit pipe 27.

The section of the exhaust orifice 11 is adjustable at will, by means of a needle-screw 25.

When the piston 3 comes near the upper end of the cylinder and lifts the valve 8, the compressed air, fed by the piping 29, fills up the chamber 13 and enters the cylinder 1 by pushing back the valve 14.

As soon as the air thus admitted within the cylinder has reached a sufficient pressure it pushes the piston 3 downwardly, and at the moment this piston has moved downward to a sufficient extent so as to no longer act on the rod of the valve 8, the latter falls back upon its seat on which it remains pressed by the pressure of the compressed air contained in the piping 29 and cuts off the admission of the compressed air in the intermediate chamber 13, on the other hand, under the action of the air contained in the cylinder, the valve 14 is also pressed on its seat and prevents, as above stated, any possible return of this air in the piping 29.

If the vehicle moves on a perfectly smooth road, the piston 3 takes such a position of equilibrium that the pressure of the air on its upper face balances the load supported by the cylinder.

If, on the contrary, the vehicle moves on a road presenting unevenness, the piston moving with the wheels raises or lowers according to the asperities of the ground and oscillates consequently with a variable amplitude above and below its position of equilibrium.

As long as these displacements maintain the position of equilibrium of the piston at a sufficiently high level in the cylinder, this piston lifts from time to time the rod 9 of the valve 8 and permits each time the introduction of a certain quantity of compressed air in the cylinder 1.

The position of equilibrium of the piston lowers more and more until it no longer strikes the rod 9. The apparatus then works as a simple compressed air spring.

If, for any reason whatever, decrease of the load for instance, the position of equilibrium of the piston lowers, this piston uncovers from time to time the orifice 11 and allows every time a certain quantity of compressed air to escape until the position of equilibrium of the said piston has come back towards the middle of the cylinder.

It will therefore be seen that the valve 8, on the one hand, and the orifice 11, on the other hand, constantly tend to bring back the position of equilibrium of the piston towards the middle of the cylinder, whatever may be the causes tending to move it away therefrom.

The pressure in the lower part of the cylinder does not vary during the oscillations of the piston, as this lower part is in communication with the atmosphere through the second orifice 12.

If, for any reason whatever, a deep hole in the road for instance, the piston moves towards the bottom of the cylinder, it closes this second orifice 12 and compresses the air between its lower face and the bottom of the cylinder 1. The pressure of this air increasing without limit, brakes the descent of the piston, which will not be able to strike against the lower bottom of the cylinder.

The wall of the cylinder 1 is also perforated with an orifice putting the said cylinder in communication with the lower part of an auxiliary chamber 16.

This auxiliary chamber 16 is intended to to increase the suppleness of the suspension as long as the displacements of the piston above and below the median position are but of small amplitude by diminishing the variation of the pressure for a given displacement of the piston.

When the piston 3 covers, when moving upward, the opening 15, the chamber 16 no longer plays any part, so that the pressure of the air contained in the cylinder 1 can rise rapidly and check the rising of the said piston, the suspension becoming progressively less elastic or resilient towards the ends of the strokes.

It is moreover to be noted that owing to the communication of the lower part of the chamber 16 with the cylinder, no accumulation of lubricating oil can ever take place in this auxiliary chamber 16, as the oil driven back in the latter by the piston comes back in the cylinder through the orifice 15 at the time the latter is uncovered by the piston; it results therefrom that the proper operation of this auxiliary chamber is always ensured.

The piston 3 is provided with a ledge 17 in which segments 18 are arranged; the rod 4 of this piston carries, at its lower part, the housing of the ball 19 of the link 7.

This rod 4 slides with a slight friction in a cylinder 20 carried by the lower bottom of the cylinder 1 and lined with air tight segments 21 surrounding the rod 4 of the piston.

This cylinder 20 is closed at its upper part by a sliding plate 22 surrounding the link 7 and connected to the said cylinder by a leather sheath 23 preventing the entrance in the apparatus of mud and dust.

The link 7 can be pivoted at its other end directly to the axle, or by means of a ball joint 38 to a collar 39, mounted on the axle 6 and to which is secured one of the ends of a thrust link 32 the other end of which is pivoted to the frame 2.

Two other sheaths 24 containing grease protect the balls 19 and 38 of the link 7.

The constructional arrangements above described are of course given only by way of example and it is obvious that the forms, materials and dimensions of the various constitutive parts may be varied without departing thereby from the prinicple of the invention.

The position of the members of the suspension apparatus might be reversed, that is to say that the piston might be made integral with the frame and the cylinder integral with the axle, in the latter case, the valve 8 controlling the admission of the compressed air as well as the distributing valve 14 and the intermediate chamber 13 would be carried by the piston.

Claims:

1. A resilient pneumatic shock-absorbing mechanism comprising in combination: a cylinder,—a piston movable in the cylinder, the said cylinder and piston being respectively connected to the bodies to be resiliently connected, an auxiliary inlet chamber,—a valve for the admission of compressed air into the said auxiliary chamber, the said valve being held upon its seat in its closing position by the pressure of the air which is to be admitted into this auxiliary chamber,—means for controlling, in concordance with the position of the piston, the opening or closing of the said valve,—and a nonreturn valve for putting the auxiliary chamber in communication with the cylinder and to open into the latter for allowing the compressed air admitted into the said auxiliary chamber to enter into the cylinder and for preventing the reflux of the air.

2. An elastic pneumatic shock absorbing mechanism as in the claim 1 comprising a receiver the inferior part of which communicates with the cylinder by a duct formed in the cylinder wall at a level such that communication between the receiver and the part of the cylinder containing compressed air is established during all the time that the piston remains under a determined position from the bottom through which compressed air is admitted, and is closed by this piston when said piston comes above said determined position in such manner that the volume of air acted upon by the piston is greater when the latter occupies a middle position so that the variations of pressure resulting from the piston travel in these middle positions are very slight.

3. An elastic pneumatic shock absorbing mechanism as in the claim 1, comprising two ducts providing communication between the cylinder and the atmosphere, one of said ducts being adapted to effect exhaust of the compressed air admitted into the cylinder when said duct is uncovered by the piston towards the end of its down stroke and the other duct being a short distance from the lower end of the cylinder and located at a level such that the lower face of the piston is in communication with the atmosphere up to the instant it reaches the end of the down stroke, whereupon the said duct being closed by the piston the air between the latter and the lower end of the cylinder forms an elastic buffer which brakes the descent of the piston and prevents the latter from striking the lower end of the cylinder.

4. An elastic pneumatic shock absorbing mechanism as in the claim 3, comprising means for regulating the cross section of the air discharge duct.

5. An elastic pneumatic shock absorbing mechanism as in the claim 3, comprising an exhaust receiver, in communication with the atmosphere, in which open the two ducts providing communication between the cylinder and the atmosphere.

The foregoing specification of my "pneumatic suspension for vehicles," signed by me this fifth day of March, 1920.

GEORGE LOUIS RENÉ JEAN MESSIER.